(12) United States Patent
Mese et al.

(10) Patent No.: US 12,058,436 B2
(45) Date of Patent: Aug. 6, 2024

(54) APPARATUS, METHODS, AND COMPUTER PROGRAM PRODUCTS FOR INCREASING THE PRODUCTION VALUE OF A VIDEO STREAM

(71) Applicant: Lenovo (Singapore) Pte. Ltd., New Tech Park (SG)

(72) Inventors: John C. Mese, Cary, NC (US); Arnold Weksler, Raleigh, NC (US); Mark Delaney, Raleigh, NC (US); Nathan Peterson, Oxford, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 36 days.

(21) Appl. No.: 17/932,015

(22) Filed: Sep. 14, 2022

(65) Prior Publication Data
US 2024/0089590 A1   Mar. 14, 2024

(51) Int. Cl.
*H04N 23/60* (2023.01)
*G06V 20/40* (2022.01)

(52) U.S. Cl.
CPC ............. *H04N 23/64* (2023.01); *G06V 20/40* (2022.01)

(58) Field of Classification Search
CPC .............................. H04N 23/64; G06V 20/40
See application file for complete search history.

(56) References Cited

U.S. PATENT DOCUMENTS

2013/0278780 A1\* 10/2013 Cazier ................ H04N 23/617
348/222.1
2014/0267868 A1\* 9/2014 Mazzola ............. H04N 23/635
348/333.02

\* cited by examiner

*Primary Examiner* — Ahmed A Berhan
(74) *Attorney, Agent, or Firm* — Kunzler Bean & Adamson

(57) ABSTRACT

Apparatus, methods, and computer program products that improve production value of a video stream are disclosed. One apparatus includes a processor and a memory that stores code executable by the processor to receive, from a camera, a signal including data for an environment a portion of which is within a field of view of the camera and the data represents a set of attributes related to a current situation of the environment. The code is further executable by the processor to analyze the data to determine one or more improvements for the attribute(s) related to the current situation of the environment that, after implementation, would increase a production value of a video stream of the current situation of the environment and notify a user of the determination. Methods and computer program products that include and/or perform the operations and/or functions of the apparatus are also disclosed.

20 Claims, 14 Drawing Sheets

APPARATUS, METHODS, AND COMPUTER PROGRAM PRODUCTS FOR INCREASING THE PRODUCTION VALUE OF A VIDEO STREAM

FIELD

The subject matter disclosed herein relates to video streaming and, more particularly, relates to improving production value of a video stream.

DESCRIPTION OF THE RELATED ART

Modern hybrid work environments rely on online meetings. One difference between in-person meetings and online meetings is a lack of visual fidelity in online meetings. This difference can result in online meeting experiences that are less engaging than in-person meeting experiences. The difference can certainly be an issue for at least some users who do not employ a certain degree of "production value" when using their cameras in online meetings, especially because these users are often unaware of what attributes contribute to and/or take away from the production value of online meetings.

BRIEF SUMMARY

Apparatus that can improve production value of a video stream are disclosed. One apparatus includes a processor and a memory that stores code executable by the processor. The code is executable by the processor to receive, from a camera, a signal including data for an environment in which a portion of the environment is within a field of view of the camera and the data represents a set of attributes related to a current situation of the portion of the environment within the field of view of the camera. The code is further executable by the processor to analyze the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera and notify a user of the determination.

Also disclosed are methods that improve the production value of a video stream. One method includes receiving, by a processor, a signal including data for an environment from a camera in which a portion of the environment is within a field of view of the camera and the data represents a set of attributes related to a current situation of the portion of the environment within the field of view of the camera. The method further includes analyzing the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera and notifying a user of the determination.

Computer program products including a computer-readable storage device including code embodied therewith for improving the production value of a video stream are further disclosed herein. The code is executable by a processor and causes the processor to receive, from a camera, a signal including data for an environment in which a portion of the environment is within a field of view of the camera and the data represents a set of attributes related to a current situation of the portion of the environment within the field of view of the camera. The code further causes the processor to analyze the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera and notify a user of the determination.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
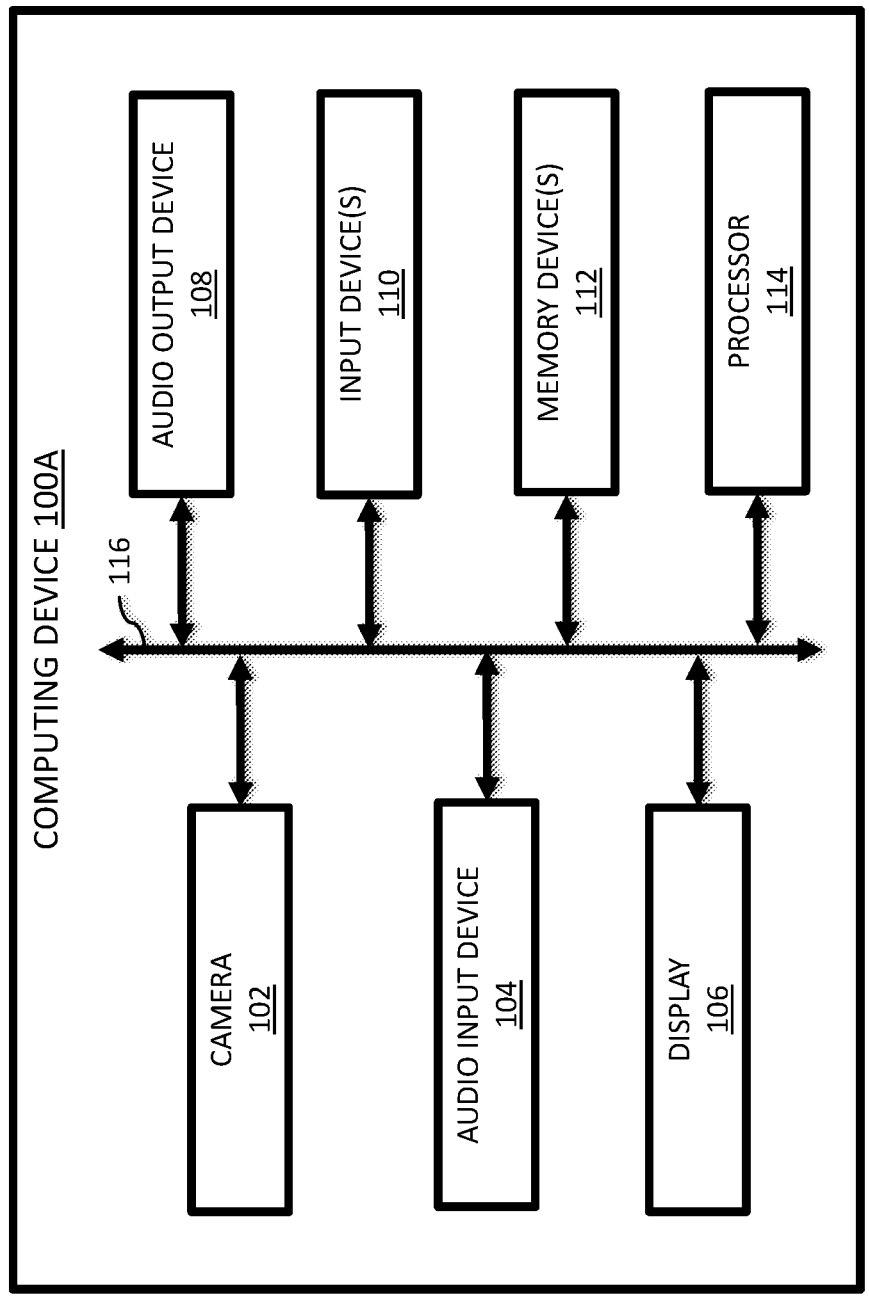
FIGS. 1A and 1B are schematic block diagrams of various embodiments of a computing device for improving production value of a video stream.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the FIGURES illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated FIGURES.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each FIGURE may refer to elements of proceeding FIGURES. Like numbers refer to like elements in all FIGURES, including alternate embodiments of like elements.

With reference to the drawings, FIG. 1A is a block diagram of one embodiment of a computing device 100A that can improve production value of a video stream. At least in the illustrated embodiment, the computing device 100A includes, among other components, a camera 102, an audio input device 104, a display 106, an audio output device 108, one or more input devices 110, one or more memory devices 112, and a processor 114 coupled to and/or in communication with one another via a bus 116 (e.g., a wired and/or wireless bus).

A camera 102 may include any suitable device that is known or developed in the future capable of capturing and transmitting images, video feeds (e.g., visual feeds, audio-visual feeds, etc.), and/or video streams (visual streams, audio-visual streams, etc.). In various embodiments, the camera 102 includes at least one video camera that can capture image data and/or video data and generate a video stream including the captured image data and/or video data. In various embodiments, the video stream is used in a video conference and/or a digital learning environment.

In certain embodiments, the camera 102 is configured to capture image data and/or video data of an environment within a field of view of the camera 102. In additional embodiments, the camera 102 is configured to transmit the image data and/or video data to the memory device(s) 112 and/or processor 114 for processing and/or analysis to improve the production value of one or more video streams. The field of view of the camera 102 can include an area within an environment that can house and/or include one or more users, one or more objects, and/or one or more environmental situations, attributes, and/or conditions (e.g., lighting, relative lighting, distance(s), relative distance(s), color(s), relative color(s), pattern(s), relative pattern(s), etc.) that can be captured by the camera 102. The one or more environmental attributes and/or conditions can include the environmental attribute(s) and/or condition(s) that actually exist and/or are capturable within the field of view of the camera 102 and/or is/are located, generated, and/or exist outside the field of view of the camera 102 but can influence, cause, and/or affect one or more objects, one or more users, and/or one or more environmental attributes and/or conditions within the field of view of the camera 102.

The image data and/or video data of the environment within the field of view of the camera 102, in some embodiments, can be captured by the camera 102 for analysis by the processor 114 prior to the camera 102 generating a video stream for use in a video conference and/or a digital learning environment. In additional or alternative embodiments, the image data and/or video data of the environment within the field of view of the camera 102 can be captured for analysis by the processor 114 while the camera 102 is generating a video stream for use in a video conference and/or digital learning environment (e.g., in real time and/or on-the-fly).

An audio input device 104 may include any suitable device that is known or developed in the future capable of capturing and transmitting audio/sound, audio feeds, and/or audio streams. In various embodiments, the audio input device 104 includes at least one microphone.

In certain embodiments, the audio input device 104 is configured to capture audio data of an environment. In additional embodiments, the audio input device 104 is configured to transmit the audio data to the memory device(s) 112 and/or processor 114 for processing and/or analysis to improve the production value of one or more video streams. The audio input device 104 can capture audio data of an environment that can house and/or include one or more users and/or one or more objects, whether within and/or outside the field of view of the camera 102.

The audio data can be captured by the audio input device 104 for analysis by the processor 114 prior to the camera 102 generating a video stream for use in a video conference and/or a digital learning environment. In additional or alternative embodiments, the audio data can be captured for analysis by the processor 114 while the camera 102 is generating a video stream for use in a video conference and/or digital learning environment (e.g., in real time and/or on-the-fly).

A display 106 may include any suitable device that is known or developed in the future capable of displaying images/data, video/data feeds, and/or video/data streams. In various embodiments, the display 106 may include an internal display or an external display. In some embodiments, the display 106 is configured to display a video/data stream and/or feed of the user and/or one or more attendees of a video conference and/or a digital learning environment (e.g., a virtual learning system, a virtual learning platform, virtual learning application/software, a classroom management system, a classroom management platform, classroom management software/application, online learning system, online learning platform, online learning application/software, a distance learning system, a distance learning platform, distance learning application/software, a video conference system, a video conference platform, digital learning environment application/software, a virtual classroom, a virtual meeting, etc., and/or the like digital learning environments or digital environments) while the video conference and/or digital learning environment is in progress.

The display 106, in certain embodiments, is configured to display one or more notifications to the user. The notification(s) for display on the display 106 may be received from the processor 114 and can include any of the one or more notifications capable of being generated by the processor 114 for notifying a user of an improvement that can be made to the user, the environment within the field of view of the camera 102, and/or the environment outside the field of view of the camera 102 to increase and/or improve the production value of a video stream captured, generated, and transmitted by the camera 102, as discussed elsewhere herein.

In some embodiments, the notification(s) is/are displayed on the display 106 prior to the camera 102 is generating a video stream for use in a video conference and/or digital learning environment. In additional or alternative embodiments, the notification(s) is/are displayed on the display 106 while the camera 102 is generating a video stream for use in a video conference and/or digital learning environment (e.g., in real time and/or on-the-fly).

The display 106, in additional or alternative embodiments, is configured to display one or more recommendations to the user. The recommendation(s) for display on the display 206 may be received from the processor 114 and can include any of the one or more recommendations capable of being generated by the processor 114 for recommending how to make an improvement and/or what to modify with respect to the user, the environment within the field of view of the camera 102, and/or the environment outside the field of view of the camera 102 to increase and/or improve the production value of a video stream captured, generated, and transmitted by the camera 102, as discussed elsewhere herein.

In some embodiments, the recommendation(s) is/are displayed on the display 206 prior to the camera 102 is generating a video stream for use in a video conference and/or digital learning environment. In additional or alternative embodiments, the recommendation(s) is/are displayed on the display 106 while the camera 102 is generating a video stream for use in a video conference and/or digital learning environment (e.g., in real time and/or on-the-fly).

An audio output device 108 may include any suitable device that is known or developed in the future capable of receiving and providing audio/sound, audio feeds, and/or audio streams. In various embodiments, the audio output device 108 includes a speaker, a set of headphones, and/or a set of earbuds, etc., among other suitable audio output devices that are possible and contemplated herein.

An input device 110 may include any suitable device that is known or developed in the future capable of receiving user input. In various embodiments, the input device 110 includes a keyboard, a mouse, a trackball, a joystick, a touchpad, and/or a touchscreen, etc., among other suitable input devices that are possible and contemplated herein.

A set of memory devices 112 may include any suitable quantity of memory devices 112. Further, a memory device 112 may include any suitable type of device and/or system that is known or developed in the future that can store computer-useable and/or computer-readable code. In various embodiments, a memory device 112 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 114).

A memory device 112, in some embodiments, includes volatile computer storage media. For example, a memory device 112 may include random access memory (RAM), including dynamic RAM (DRAM), synchronous dynamic RAM (SDRAM), and/or static RAM (SRAM). In other embodiments, a memory device 112 includes non-volatile computer storage media. For example, a memory device 112 may include a hard disk drive, a flash memory, and/or any other suitable non-volatile computer storage device that is known or developed in the future. In various embodiments, a memory device 112 includes both volatile and non-volatile computer storage media.

Figure 2A:
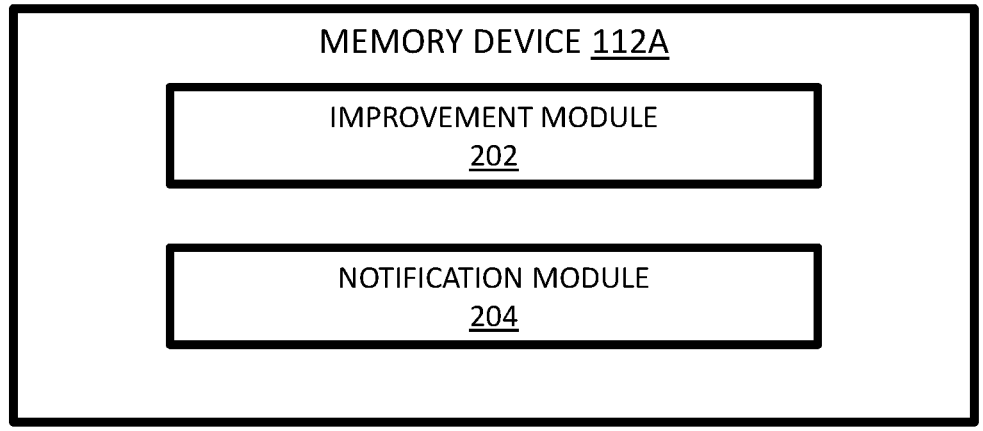
FIGS. 2A through 2C are schematic block diagrams of various embodiments of a memory device included in the computing devices of FIGS. 1A and 1B.

With reference now to FIG. 2A, FIG. 2A is a schematic block diagram of one embodiment of a memory device 112. At least in the illustrated embodiment, the memory device 112 includes, among other components, features, and/or elements, an improvement module 202 and a notification module 204 that are configured to operate/function together when executed by the processor 114 to improve production value of a video stream.

An improvement module 202 may include any suitable hardware and/or software capable of determining one or more improvements for a video stream. In various embodiments, the improvement module 202 is configured to receive one or more signals generated by the camera 102 and/or one or more signals generated by the audio input device 104 and determine one or more improvements for a video stream (e.g., a video conference, a digital learning environment, and/or the like) based on data in the signal(s) received from the camera 102 and/or data in the signal(s) received from the audio input device 104.

In some embodiments, the improvement module 202 is configured to determine the improvement(s) prior to and/or before the beginning of a video stream (e.g., before the start of a video conference and/or digital learning environment, etc.). In additional or alternative embodiments, the improvement module 202 is configured to determine the improvement(s) at the beginning of a video stream and/or within a predetermined/threshold amount of time after the start of a video stream (e.g., in real time and/or on-the-fly), which can include any suitable amount of time within which the improvement(s) are capable of being determined (e.g., less than about one (1) minute, less than about two (2) minutes, less than about three (3) minutes, less than about four (4) minutes, less than about five (5) minutes, etc.). In further additional or alternative embodiments, the improvement module 202 is configured to determine the improvement(s) during a video stream (e.g., in real time and/or on-the-fly), which can include any suitable time during the video stream within which the improvement(s) are capable of being determined. In still further additional or alternative embodiments, the improvement module 202 is configured to determine the improvement(s) after completion of a video stream, which can include any suitable time and/or suitable amount of time after finishing the video stream.

In certain embodiments, the data included in the signal(s) (e.g., image signal(s), video signal(s), etc.) received from the camera 102 and/or the signal(s) (e.g., audio signal(s)) received from the audio input device 104 can include a representation of an environment within a field of view of the camera 102. The representation of the environment can include one or more attributes of the environment within the field of view of the camera 102. In addition, the data included in the signal(s) received from the camera 102 and/or the signal(s) received from the audio input device 104 can include a representation of one or more attributes of the environment within the field of view of the camera 102 that is/are affected by and/or caused by one or more attributes of the environment surrounding the camera 102 and/or audio input device 104 that is/are outside the field of view of the camera 102.

As referred to herein, the term environment can include an area within which the camera 102 and/or audio input device 104 is housed/located and/or an area within which a user can utilize a computing device 100A, computing device 100B

(see, FIG. 1B), camera 102, and/or audio input device 104 for a video conference, a digital learning environment, and/or the like video stream. Here, the area within which the camera 102 and/or audio input device 104 is housed/located and/or the area within which a user can utilize the computing device 100A or 100B for a video conference, a digital learning environment, and/or the like video stream can include the portion of the area of the environment within the field of view of the camera 102 and/or one or more portions of the area of the environment outside the field of view of the camera 102.

An attribute of an environment for conducting a video conference, a digital learning environment, and/or the like video stream and/or that can house a computing device 100A/100B, camera 102, and/or audio input device 104 can include any suitable quality, trait, characteristic, element, aspect, property, and/or feature of an environment and/or an area within which a computing device 100A/100B, camera 102, and/or audio input device 104 can be housed/located and/or an area within which a user can utilize a computing device 100A/100B, camera 102, and/or audio input device 104 for a video conference, a digital learning environment, and/or the like video stream that can be perceived by a human and/or capturable by the camera 102 and/or the audio input device 104. In various embodiments, the attributes of an environment can include one or more visual attributes and/or one or more auditory attributes of the environment, each of which can include, depending on one or more various times, static and/or dynamic properties and/or characteristics.

Example visual attributes of an environment can include, but are not limited to, lighting in general, the lighting of one or more objects, relative lighting in general, the relative lighting of one or more objects and/or between two or more objects, positioning in general, the positioning of one or more objects, the relative positioning of one or more objects or between two or more objects, color/coloring (e.g., hue, shade, intensity, lightness, brightness, saturation, chroma, value, mixture, tone, tint, grayscale, etc.) in general, the color/coloring of one or more objects, the relative color/coloring of one or more objects or between two or more objects, patterns and/or patterning in general (e.g., color, coloring, shape, size, degree, etc.), the pattern(s) and/or patterning of one or more objects, the relative pattern(s) and/or patterning of one or more objects or between two or more objects action, movement and/or action(s) in general, the movement and/or action(s) of one or more objects, the relative movement and/or action(s) of one or more objects and/or between two or more objects, stillness and/or static state(s) in general, the stillness and/or static state(s) of one or more objects, and/or the relative stillness and/or static state(s) of one or more objects and/or between two or more objects, etc., among other visual attributes of an environment and/or area that can be visually perceived by a human and/or that is/are capturable by the camera 102 that are possible, each of which is contemplated herein. Example auditory attributes can include, but are not limited to, sound/noise in general, the sound/noise(s) generated by one or more objects, the relative sound/noise(s) generated by one or more objects and/or between two or more objects, volume in general, the volume(s) generated by one or more objects, the relative volume(s) generated by one or more objects and/or between two or more objects, pitch in general, the pitch(es) generated by one or more objects, the relative pitch(es) generated by one or more objects and/or between two or more objects, frequency in general, the frequency/frequencies generated by one or more objects, the relative frequency/frequencies generated by one or more objects and/or between two or more objects, duration of sound/noise(s) in general, the duration(s) of sound/noise(s) generated by one or more objects, the relative duration(s) of sound/noise(s) generated by one or more objects and/or between two or more objects, sound/noise pattern(s) in general, the sound/noise pattern(s) generated by one or more objects, and/or the relative sound/noise pattern(s) generated by one or more objects and/or between two or more objects, etc., among other audio attributes of an environment and/or area that can be audibly perceived by a human and/or that is/are capturable by a camera 102 and/or that are possible, each of which is contemplated herein.

In additional or alternative embodiments, the data included in the signal(s) (e.g., image signal(s), video signal(s), etc.) received from the camera 102 and/or the signal(s) (e.g., audio signal(s) received from the audio input device 104 can include a representation of a situation and/or one or more happenings of one or more users and/or one or more objects that are currently occurring, that may/can occur in the future, and/or occurred in the past within an environment within the field of view of the camera 102. The representation of the situation and/or the happening(s) within the environment can include a representation of one or more dynamic attributes and/or conditions of the environment within the field of view of the camera 102 that is/are affected by and/or caused by one or more objects and/or attributes of the environment surrounding the camera 102 and/or audio input device 104 that is/are outside the field of view of the camera 102.

A situation and/or happening can include any suitable dynamic action or set of dynamic actions that may occur and/or can occur during a video stream (e.g., during a video conference, a virtual learning environment, and/or the like video streams). In some embodiments, a situation/happening includes one or more actions performed by one or more users and/or humans. In additional or alternative embodiments, a situation/happening includes one or more actions performed by one or more third parties (e.g., one or more non-users, non-human entities, devices, systems, and/or external devices/entities, etc.).

In various embodiments, the improvement module 202 is configured to analyze the data received from the camera 102 and/or the audio input device 104. The analysis can be related to any suitable attribute of an environment, an attribute of an area of the environment within the field of view of a camera 102, an attribute of an area of the environment outside the field of view of a camera 102, an attribute of an object within the environment, an attribute of an object within the field of view of a camera 102, an attribute of an object outside the field of view of a camera 102, a situation/happening occurring in the environment, a situation/happening occurring or predicted to occur within the field of view of a camera 102, and/or a situation/happening occurring or predicted to occur outside the field of view of a camera 102, etc., that may affect and/or that has the possibility of affecting the production value of a video stream (e.g., video conference, digital learning environment, etc.). In various embodiments, the analysis can be related to visual aspects/attributes of an environment and/or to audio aspects of an environment.

Example aspects/attributes for inclusion and/or consideration in a visual analysis of an environment can include, but are not limited to, lighting in general, the lighting of one or more objects, relative lighting in general, the relative lighting of one or more objects and/or between two or more objects, positioning in general, the positioning of one or more objects, the relative positioning of one or more objects or between two or more objects, color/coloring (e.g., hue, shade, intensity, lightness, brightness, saturation, chroma, value, mixture, tone, tint, grayscale, etc.) in general, the color/coloring of one or more objects, the relative color/coloring of one or more objects or between two or more objects, patterns and/or patterning in general (e.g., color, coloring, shape, size, degree, etc.), the pattern(s) and/or patterning of one or more objects, the relative pattern(s) and/or patterning of one or more objects or between two or more objects action, movement and/or action(s) in general, the movement and/or action(s) of one or more objects, the relative movement and/or action(s) of one or more objects and/or between two or more objects, stillness and/or static state(s) in general, the stillness and/or static state(s) of one or more objects, and/or the relative stillness and/or static state(s) of one or more objects and/or between two or more objects, etc., among other visual attributes of an environment and/or area that can be visually perceived by a human and/or that is/are capturable by the camera 102 that are possible, each of which is contemplated herein. In various embodiments, lighting can be analyzed for graininess, intensity (e.g., too dark, too light/bright, etc.), shadowing (e.g., hard shadow(s), harsh shadow(s), etc.), positioning, and/or relative positioning, etc., among other lighting possibilities, each of which is contemplated herein. Further, framing and/or staging can be analyzed for distance(s) between frame and a user's face, ceiling/door detection, edge detection, angle(s) between objects, users (e.g., user's face), and/or object(s)/user(s), and/or distance(s) between objects, users (e.g., user's face), and/or object(s)/user(s), etc., among other framing and/or staging possibilities, each of which is contemplated herein. In addition, color can be analyzed for color of clothing, color of objects, color of background, and/or color of patterns, etc., among other color possibilities, each of which is contemplated herein.

Example aspects/attributes for inclusion and/or consideration in an audio analysis of an environment include, but are not limited to, sound/noise in general, the sound/noise(s) generated by one or more objects, the relative sound/noise(s) generated by one or more objects and/or between two or more objects, volume in general, the volume(s) generated by one or more objects, the relative volume(s) generated by one or more objects and/or between two or more objects, pitch in general, the pitch(es) generated by one or more objects, the relative pitch(es) generated by one or more objects and/or between two or more objects, frequency in general, the frequency/frequencies generated by one or more objects, the relative frequency/frequencies generated by one or more objects and/or between two or more objects, duration of sound/noise(s) in general, the duration(s) of sound/noise(s) generated by one or more objects, the relative duration(s) of sound/noise(s) generated by one or more objects and/or between two or more objects, sound/noise pattern(s) in general, the sound/noise pattern(s) generated by one or more objects, and/or the relative sound/noise pattern(s) generated by one or more objects and/or between two or more objects, etc., among other audio attributes of an environment and/or area that can be audibly perceived by a human and/or that is/are capturable by a camera 102 and/or that are possible, each of which is contemplated herein. In some embodiments, the analysis can be related to the timing of sound/noise (e.g., when sound/noise can occur and/or is predicted to occur) and/or the acoustics of an environment.

Aspects/attributes for inclusion and/or consideration in an analysis of the happenings and/or predicted happenings within an environment can include any suitable attribute related to one or more actions performed by a user. Example aspects/attributes for inclusion and/or consideration in an analysis of the happenings and/or predicted happenings within an environment can include, but are not limited to, the user eating, the user drinking, the user not paying attention/focusing, the user looking elsewhere and/or not looking at the camera 102, the frequency of the user looking elsewhere and/or not looking at the camera 102, the user losing focus (e.g., looks at a phone, answers a phone, the phone rings, the phone receives a text, etc.), the user performs a gesture too often and/or in a distracting manner (e.g., touches face, sniffs, blinks, clears throat, grunts, makes unusual expression, has one or more tics, etc.), and/or the user steps away, etc., among other happenings and/or predicted happenings that are possible, each of which is contemplated herein.

The improvement module 202, in additional embodiments, is configured to determine one or more improvements for a video stream (e.g., a video conference, digital learning environment, and the like video streams) based on the analysis. The determined improvement(s), when implemented in a video stream, can improve and/or increase the production value of the video stream.

An improvement may include any suitable improvement that is known or developed in the future that can improve and/or increase the production value of a video stream. In various embodiments, an improvement can be related to an attribute of an environment, an attribute of an area of the environment within the field of view of a camera 102, an attribute of an area of the environment outside the field of view of a camera 102, an attribute of an object within the environment, an attribute of an object within the field of view of a camera 102, an attribute of an object outside the field of view of a camera 102, a situation/happening occurring in the environment, a situation/happening occurring within the field of view of a camera 102, and/or a situation/happening occurring outside the field of view of a camera 102, etc., that can improve and/or increase the production value of a video stream (e.g., video conference, digital learning environment, etc.) and/or that can have the effect of improving and/or increasing the production value of a video stream, among other improvements that are possible, each of which is contemplated herein. In additional or alternative embodiments, an improvement may include any suitable change, modification, addition/insertion, and/or deletion/subtraction capable of being made to an attribute of an environment, an attribute of an area of the environment within the field of view of a camera 102, an attribute of an area of the environment outside the field of view of a camera 102, an attribute of an object within the environment, an attribute of an object within the field of view of a camera 102, an attribute of an object outside the field of view of a camera 102, a situation/happening occurring in the environment, a situation/happening occurring within the field of view of a camera 102, and/or a situation/happening occurring outside the field of view of a camera 102, etc., that can improve and/or increase the production value of a video stream and/or that can have the effect of improving and/or increasing the production value of a video stream, among other improvements that are possible, each of which is contemplated herein. In various embodiments, the improvement can be related to visual aspects/attributes of an environment, audio aspects/attributes of an environment, and/or to happenings/predicted happenings that can occur in the environment.

Example visual improvements can include, but are not limited to, improvements related to lighting in general, the lighting of one or more objects, relative lighting in general, the relative lighting of one or more objects and/or between two or more objects, positioning in general, the positioning of one or more objects, the relative positioning of one or more objects or between two or more objects, color/coloring (e.g., hue, shade, intensity, lightness, brightness, saturation, chroma, value, mixture, tone, tint, grayscale, etc.) in general, the color/coloring of one or more objects, the relative color/coloring of one or more objects or between two or more objects, patterns and/or patterning in general (e.g., color, coloring, shape, size, degree, etc.), the pattern(s) and/or patterning of one or more objects, the relative pattern(s) and/or patterning of one or more objects or between two or more objects action, movement and/or action(s) in general, the movement and/or action(s) of one or more objects, the relative movement and/or action(s) of one or more objects and/or between two or more objects, stillness and/or static state(s) in general, the stillness and/or static state(s) of one or more objects, and/or the relative stillness and/or static state(s) of one or more objects and/or between two or more objects, etc., among other visual attributes of an environment and/or area that can be visually perceived by a human and/or that is/are capturable by the camera 102 that are possible, each of which is contemplated herein. In various embodiments, lighting can be improved by modifying and/or improving graininess, intensity, shadowing, positioning, and/or relative positioning, etc., of one or more lighting attributes, aspects, and/or light sources, among other lighting possibilities that is/are capable of being improved and/or modified to increase and/or improve the production value of a video stream, each of which is contemplated herein. Further, framing and/or staging can be improved by modifying and/or improving the distance(s) between frame and a user's face, modifying and/or improving ceiling/door positioning and/or relative positioning, modifying and/or improving edge positioning and/or relative positioning, modifying and/or improving angle(s) between objects, users (e.g., user's face), and/or object(s)/user(s), and/or modifying and/or improving distance(s) between objects, users (e.g., user's face), and/or object(s)/user(s), etc., among other framing and/or staging possibilities that is/are capable of being improved and/or modified to increase and/or improve the production value of a video stream, each of which is contemplated herein. In addition, color can be improved by modifying and/or improving color of the user's clothing (e.g., to match color(s) in the environment and/or not to clash color(s) in the environment), modifying and/or improving color of one or more objects in the environment (e.g., to match other colors in the environment and/or not to clash with other colors in the environment), modifying and/or improving background color of the environment (e.g., use of neutral colors, colors suitable for the content/context of the video stream, etc.), and/or modifying and/or improving color of patterns and/or patterns (e.g., to match other patterns in the environment and/or not to clash with other patterns in the environment), etc., among other color possibilities that is/are capable of being improved and/or modified to increase and/or improve the production value of a video stream, each of which is contemplated herein.

Example audio improvements for an environment can include, but are not limited to, sound/noise in general, the sound/noise(s) generated by one or more objects, the relative sound/noise(s) generated by one or more objects and/or between two or more objects, volume in general, the volume(s) generated by one or more objects, the relative volume(s) generated by one or more objects and/or between two or more objects, pitch in general, the pitch(es) generated by one or more objects, the relative pitch(es) generated by one or more objects and/or between two or more objects, frequency in general, the frequency/frequencies generated by one or more objects, the relative frequency/frequencies generated by one or more objects and/or between two or more objects, duration of sound/noise(s) in general, the duration(s) of sound/noise(s) generated by one or more objects, the relative duration(s) of sound/noise(s) generated by one or more objects and/or between two or more objects, sound/noise pattern(s) in general, the sound/noise pattern(s) generated by one or more objects, and/or the relative sound/noise pattern(s) generated by one or more objects and/or between two or more objects, etc., among other audio attributes of an environment and/or area that can be audibly perceived by a human and/or that is/are capturable by a camera 102 and/or that are possible, each of which is contemplated herein. In some embodiments, the improvement and/or modification can be related to the timing of sound/noise (e.g., when sound/noise can occur and/or is predicted to occur). In other embodiments, the improvement and/or modification can be related to elimination noise/sound (e.g., silencing an object and/or source). In still other embodiments, the improvement and/or modification can be related to making one or more modifications to the environment to improve the acoustics of the environment.

Example happenings/predicted happenings improvements for an environment can include, but are not limited to, eliminating or at least reducing one or more actions performed by a user. Specifically, eliminating the occurrence of or at least reducing the occurrence of the user eating, the user drinking, the user not paying attention/focusing, the user looking elsewhere and/or not looking at the camera 102, the frequency of the user looking elsewhere and/or not looking at the camera 102, the user losing focus, the user performing a gesture too often and/or in a distracting manner, and/or the user stepping away, etc., among other improvements to happenings and/or predicted happenings that are possible, each of which is contemplated herein.

An improvement (and/or modification) can be determined using any suitable technology, technique, algorithm, process, and/or method that is known or developed in the future capable of determining and/or identifying an improvement (and/or modification) that, when implemented and/or in response to being implemented, can and/or may improve and/or increase the production value of a video stream (e.g., video conference, digital learning environment, etc.). In various embodiments, the improvement module 202 is configured to determine an improvement based on a comparison.

A comparison may include any suitable comparison technique and/or type of comparison technique that is known or developed in the future. In some embodiments, the improvement module 202 is configured to determine an improvement or a set of two or more improvements that would improve and/or increase the production value of a video stream based on a comparison of one or more current and/or predicted attributes and/or happenings of an environment around a computing device 100A/100B, a camera 102, and/or an audio input device 104 and a set of one or more rules and/or one or more guidelines. In various embodiments, the improvement module 202 is configured to store and/or access the rule(s) and/or guideline(s) used for comparison.

In certain embodiments, the rule(s) and/or guideline(s) that is are included/stored in and/or accessible by the improvement module 202 define one or more attributes, one or more qualities, one or more traits, one or more characteristics, one or more elements, one or more aspects, one or more properties, and/or one or more features of an ideal video stream and/or a video stream that includes a high production value and/or optimal production value. In various embodiments, the rule(s) and/or guideline(s) may be preset/predetermined in general and/or may be set and/or modifiable by the user.

An ideal video stream and/or video stream that includes a high and/or optimal production value defined by the rule(s) and/or guideline(s) may be based on any suitable criteria/criterion that is known or developed in the future. Example criteria/criterion can include, but are not limited to, cultural and/or culture-specific criteria/criterion, religious and/or religion-specific criteria/criterion, industrial and/or industry-specific criteria/criterion, business and/or business-specific criteria/criterion, user(s) and/or user(s)-specific criteria/criterion, group and/or group-specific criteria/criterion, educational and/or education-specific criteria/criterion, governmental and/or government-specific criteria/criterion, and/or the like criteria/criterion, among other criteria/criterion that are possible, each of which is contemplated herein.

The set of one or more rules and/or set of one or more guidelines that define the attribute(s), one or more qualities, trait(s), characteristic(s), element(s), aspect(s), one or more properties, and/or feature(s) of an ideal video stream and/or a video stream that includes a high production value and/or optimal production value may include any suitable rule(s) and/or guideline(s) that is/are known or developed in the future. Further, the rule(s) and/or guideline(s) defining the ideal video stream and/or a video stream that includes a high production value and/or optimal production value can correspond to and/or be associated with any suitable one or more visual and/or audio attributes, qualities, traits, characteristics, elements, aspects, properties, and/or features of the environment within which a video stream occurs (e.g., within the field of view and/or outside the field of view of a camera 102) and/or the happenings that can and/or may occur within the environment that is/are known or developed in the future.

For example, visual attributes of the ideal video stream and/or a video stream that includes a high production value and/or optimal production value can include one or more rules and/or one or more guidelines related to one or more lighting attributes (e.g., graininess, intensity, shadowing, positioning, and/or relative positioning, etc.), one or more framing attributes and/or staging attributes (e.g., distance(s) between the video frame and a user's face, ceiling/door detection, edge detection, angle(s) between objects, users (e.g., user's face), and/or object(s)/user(s), and/or distance(s) between objects, users (e.g., user's face), and/or object(s)/user(s), etc.), and/or one or more color attributes (e.g., color of clothing, color of objects, color of background, and/or color of patterns, etc.), among other visual attributes of a video stream that can improve and/or increase the production value of a video stream that are possible, each of which is contemplated herein. Further, audio attributes of the ideal video stream and/or a video stream that includes a high production value and/or optimal production value can include one or more rules and/or one or more guidelines related to one or more sound/noise attributes (e.g., volume, pitch, frequency, duration, pattern(s), etc.). In addition, attributes related to happenings occurring in the ideal video stream and/or a video stream that includes a high production value and/or optimal production value can include one or more rules and/or one or more guidelines related to the non-occurrence of and/or a reduction in the occurrence of one or more user actions (e.g., the user eating, the user drinking, the user not paying attention/focusing, the user looking elsewhere and/or not looking at the camera 102, the frequency of the user looking elsewhere and/or not looking at the camera 102, the user losing focus, the user performs a gesture too often and/or in a distracting manner, and/or the user steps away, etc.).

To determine an improvement, the improvement module 202 is configured to determine whether there is difference between one or more current attributes of the environment and one or more corresponding attributes of the ideal video stream and/or video stream with a high and/or optimal production value. The improvement module 202 is configured to determine and/or identify an improvement for each attribute of the current environment in response to a non-match of or at least a deviation of an attribute from the corresponding attribute in the ideal video stream and/or video stream with a high and/or optimal production value. In addition, the improvement module 202 is configured to determine and/or identify an improvement for a happening in the environment in response to the user performing one or more actions not included in the ideal video stream and/or video stream with a high and/or optimal production value and/or deviating from one or more actions included in the ideal video stream and/or video stream with a high and/or optimal production value.

The improvement module 202 is configured to determine that an improvement is not needed for an attribute of the current environment in response to matching attributes of the current environment and the ideal video stream and/or video stream with a high and/or optimal production value. In addition, the improvement module 202 is configured to determine that an improvement for a happening in the environment is not needed in response to the user not performing any actions that not included in the ideal video stream and/or video stream with a high and/or optimal production value and/or the user's actions match the actions included in the ideal video stream and/or video stream with a high and/or optimal production value.

The improvement module 202, in additional embodiments, is configured to store the determined improvement(s) for one or more situations, including each situation, in which an improvement is determined. In some embodiments, the stored determined improvement(s) and/or corresponding situation(s) can be used as the basis for learning the determined improvement(s) for one or more corresponding situations, including the improvement(s) for each corresponding situation.

As such, the improvement module 202, in various embodiments, is configured to determine and/or identify the attribute(s) of a current situation and compare the attribute(s) of the current situation to the attribute(s) of one or more stored previous situations to determine a match. Here, the improvement module 202 is further configured to utilize the improvement(s) for the current situation that was/were determined for the stored previous situation in response to determining a match. Alternatively, the improvement module 202 is further configured to determine the improvement(s) for the current situation de novo as set forth above in response to failing to determine a match.

Figure 2B:
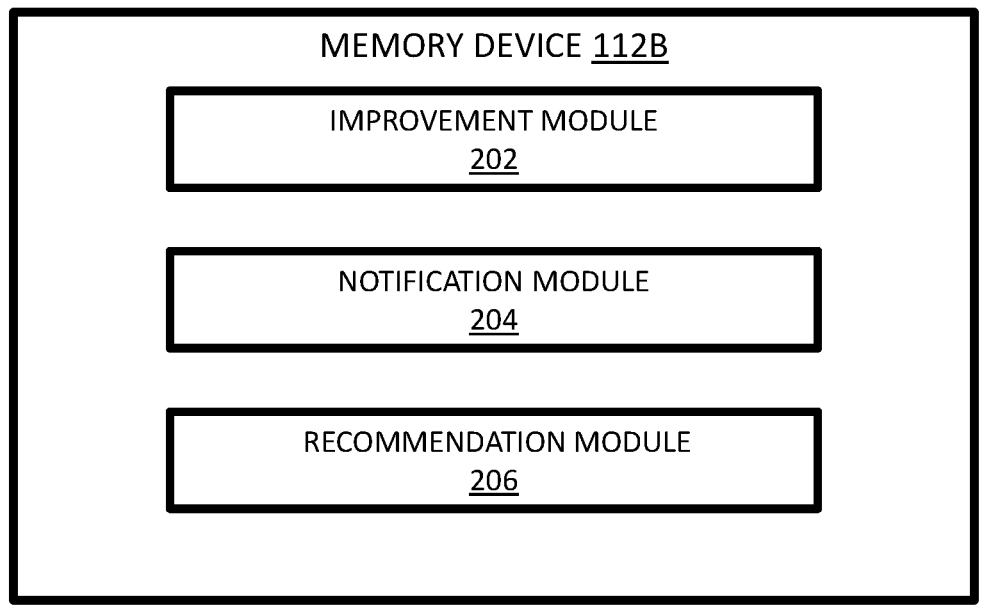

In various embodiments, the improvement module 202 is configured to transmit a signal to the notification module 204 and/or to a recommendation module 206 (see, FIG. 2B). The signal can include an indication of the improvement(s) determined and/or identified by the improvement module 202.

A notification module 204 may include any suitable hardware and/or software capable of notifying a user of the improvement(s) determined and/or identified by the improvement module 202. The notification may include any suitable notification and/or type of notification that is known or developed in the future.

In some embodiments, the notification module 204 is configured to visually notify the user of the improvement(s). For example, the notification module 204 can provide a visual notification on the display 106.

In additional or alternative embodiments, the notification module 204 is configured to audibly notify the user of the improvement(s). For example, the notification module 204 can provide an audio notification via the audio output device 108.

With reference to FIG. 2B, FIG. 2B is a block diagram of another embodiment of a memory device 112B. The memory device 112B includes an improvement module 202 and a notification module 204 similar to the improvement module 202 and notification module 204 in the memory device 112A discussed with reference to FIG. 1A. At least in the illustrated embodiment, the memory device 112B further includes, among other components, features, and/or elements, a recommendation module 206.

A recommendation module 206 may include any suitable hardware and/or software that can determine one or more recommendations for improving and/or increasing the production value of a video stream and provide the recommendation(s) to a user. The recommendation(s) may include any suitable recommendation that is known or developed in the future capable of improving and/or increasing the production value of a video stream. In various embodiments, the recommendation(s) determined by the recommendation module 206 correspond to the improvement(s) determined by the improvement module 202.

In some embodiments, a recommendation can include a modification to one or more visual attributes of the current environment related to a corresponding/associated improvement determined by the improvement module 202. For example, the recommendation module 206 can suggest that the user change the color of their clothing to a color and/or particular color that matches the walls of the environment consistent with the improvement module 202 determining that the color of the user's clothing is distracting, clashes with the wall color, and/or does not match the wall color. In another non-limiting example, the recommendation module 206 can suggest that the user change the distance that the user is sitting away from the camera 102 consistent with the improvement module 202 determining that the position of the user violates the "3 finger rule" (e.g., the top of the user's head is greater than or less than the width of three fingers from the top edge of the video frame). In yet another non-limiting example, the recommendation module 206 can suggest that the user change the lighting and/or the position of a light source located within and/or outside the field of view of the camera 102 consistent with the improvement module 202 determining that the environment is too dark and/or the current lighting casts an undesirable shadow on the user and/or a portion of the user.

In additional or alternative embodiments, a recommendation can include a modification to one or more audio attributes of the current environment related to a corresponding/associated improvement determined by the improvement module 202. For example, the recommendation module 206 can suggest that the user remove an object that is capable of and/or known to generate noise consistent with the improvement module 202 determining that the object may generate noise during a video stream (e.g., a clock chiming at the top of the hour, etc.). In another non-limiting example, the recommendation module 206 can suggest that the user mute their cell phone consistent with the improvement module 202 determining that the user is carrying a cell phone. In yet another non-limiting example, the recommendation module 206 can suggest that the user decrease the distance the user is sitting away from the audio input device 104 and/or speak louder consistent with the improvement module 202 determining that the volume of the user's voice is too low.

In further additional or alternative embodiments, a recommendation can include a modification to one or more happenings that can and/or may occur in the current environment related to a corresponding/associated improvement determined by the improvement module 202. For example, the recommendation module 206 can suggest that the user not eat and/or drink or cease eating and/or drinking during a video stream consistent with the improvement module 202 determining that eating/drinking during a video stream is not appropriate behavior. In another non-limiting example, the recommendation module 206 can suggest that the user remain seated during the entire video stream consistent with the improvement module 202 determining that the user is standing up too frequently. In yet another non-limiting example, the recommendation module 206 can suggest that the user move less and/or quiet their body consistent with the improvement module 202 determining that the user is fidgeting.

While specific examples of recommendations and improvements have been discussed herein, the various embodiments are not limited to the various recommendation and/or improvement examples. That is, various other embodiments can include any other suitable recommendation(s) and/or improvement(s) consistent with the spirit and scope of this disclosure.

The recommendation module 206 may provide the recommendation(s) to the user using any suitable communication technique and/or method that is known or developed in the future. In some embodiments, the recommendation module 206 is configured to visually notify the user of the improvement(s) (e.g., via the display 106). In additional or alternative embodiments, the recommendation module 206 is configured to audibly notify the user of the recommendation(s) (e.g., via the audio output device 108).

The recommendation module 206, in additional embodiments, is configured to store the determined recommendation(s) for one or more improvements, including each improvement, in which a recommendation is determined. In some embodiments, the stored determined recommendation(s) and/or corresponding improvement(s) can be used as the basis for learning the determined recommendation(s) for one or more corresponding improvements, including the recommendation(s) for each corresponding improvement.

As such, the recommendation module 206, in various embodiments, is configured to determine and/or identify the improvements(s) of a current situation and compare the improvement(s) of the current situation to the improvement(s) of one or more stored previous situations to determine a match. Here, the recommendation module 206 is further configured to utilize the recommendation(s) for the current situation that was/were determined for the stored previous situation in response to determining a match. Alternatively, the recommendation module 206 is further configured to determine the recommendation(s) for the current situation de novo as set forth above in response to failing to determine a match.

Figure 1B:
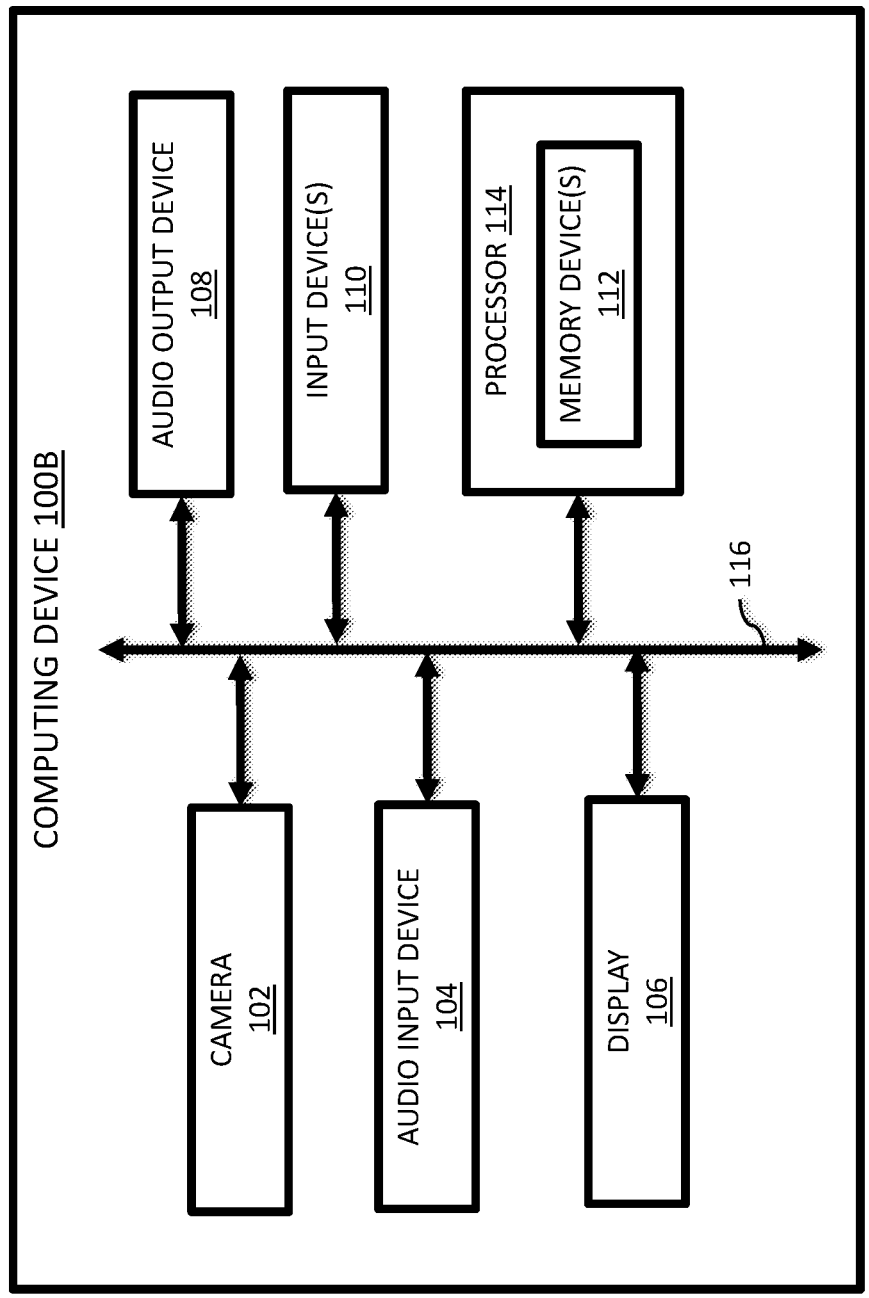
Figure 2C:
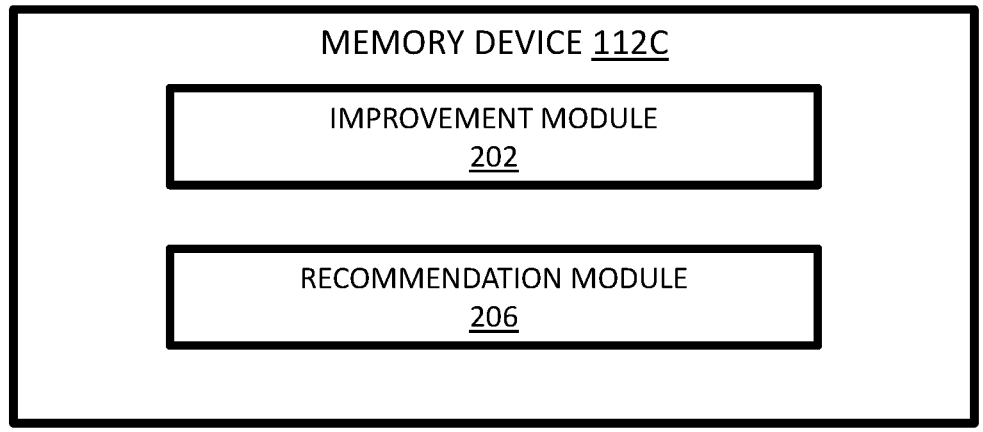

Referring to FIG. 2C, FIG. 2C is a block diagram of yet another embodiment of a memory device 112C. At least in the illustrated embodiment, the memory device 112C includes, among other components, elements, and/or features, an improvement module 202 and a recommendation module 206 similar to the improvement module 204 and recommendation module 206 in the memory device 112B discussed with reference to FIG. 1B.

Referring back to FIG. 1A, a processor 114 may include any suitable non-volatile/persistent hardware and/or software configured to perform and/or facilitate performing various processing functions and/or operations. In various embodiments, the processor 114 includes hardware and/or software for executing instructions in one or more modules and/or applications. The modules and/or applications executed by the processor 114 can be stored on and executed from a memory device 112 (e.g., memory device 112A, 112B, and 112C) and/or from the processor 114.

Figure 3A:
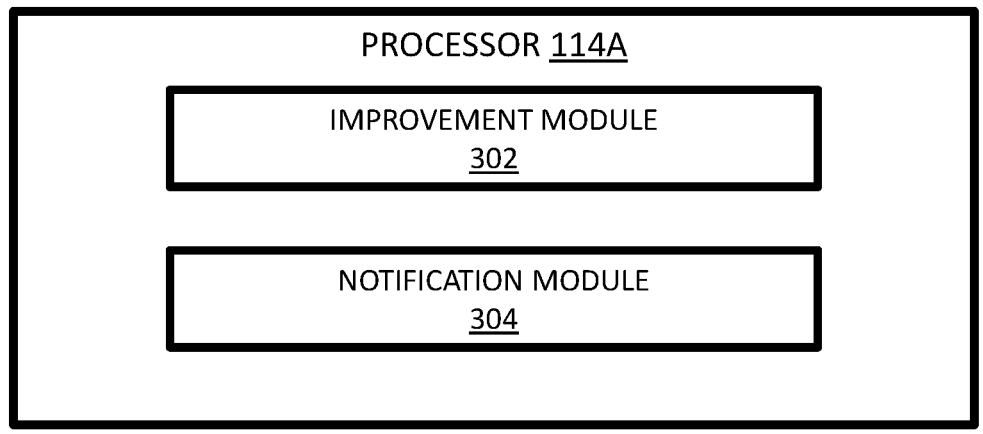
FIGS. 3A through 3C are schematic block diagrams of various embodiments of a processor included in the computing devices of FIGS. 1A and 1B.

With reference to FIG. 3A, FIG. 3A is a schematic block diagram of one embodiment of a processor 114A. At least in the illustrated embodiment, the processor 114A includes, among other components, features, and/or elements, an improvement module 302 and a notification module 304 that are configured to operate/function together when executed by the processor 114A to improve and/or increase production value of a video stream similar to the improvement module 202 and notification module 204, respectively, in the memory device 112A discussed with reference to FIG. 2A.

Figure 3B:
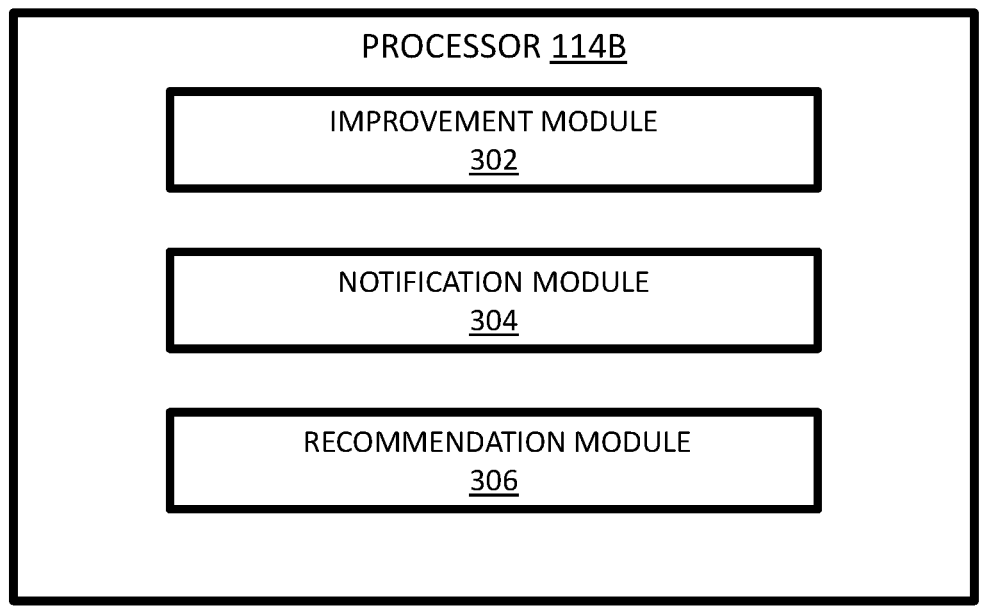

Referring to FIG. 3B, FIG. 3B is a schematic block diagram of another embodiment of a processor 114B. At least in the illustrated embodiment, the processor 114B includes, among other components, features, and/or elements, an improvement module 302, a notification module 304, and a recommendation module 306 that are configured to operate/function together when executed by the processor 114B to improve and/or increase production value of a video stream similar to the improvement module 202, notification module 204, and recommendation module 206, respectively, in the memory device 112B discussed with reference to FIG. 2B.

Figure 3C:
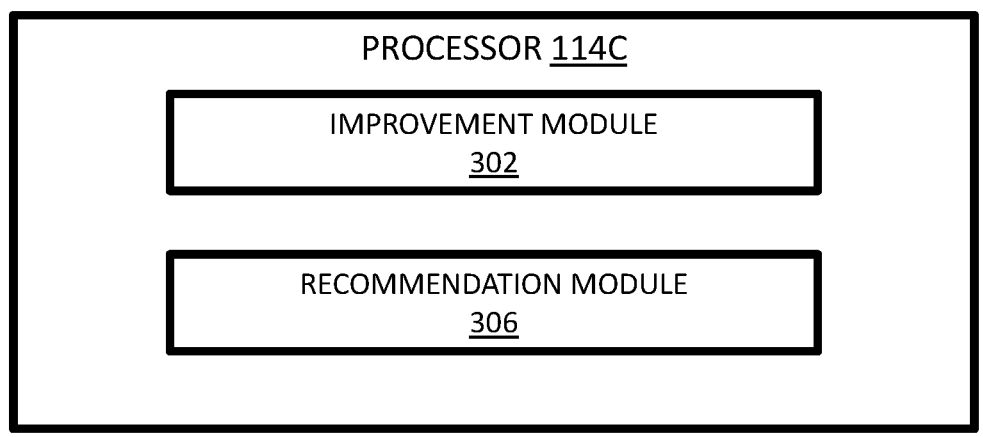

With reference to FIG. 3C, FIG. 3C is a schematic block diagram of yet another embodiment of a processor 114C. At least in the illustrated embodiment, the processor 114C includes, among other components, features, and/or elements, an improvement module 302 and a recommendation module 306 that are configured to operate/function together when executed by the processor 114C to improve and/or increase production value of a video stream similar to the improvement module 202 and recommendation module 206, respectively, in the memory device 112C discussed with reference to FIG. 2C.

Referring to FIG. 1B, FIG. 1B is a block diagram of another embodiment of a computing device 100B that can improve production value of a video stream. At least in the illustrated embodiment, the computing device 100B includes, among other components, a camera 102, an audio input device 104, a display 106, an audio output device 108, one or more input devices 110, one or more memory devices 112, and a processor 114 coupled to and/or in communication with one another via a bus 116 similar to the computing device 100A. Alternative to the computing device 100A, the processor 114 in the computing device 100B includes the memory device(s) 112 as opposed to the memory device(s) 112 of the computing device 100B being a different device than and/or independent of the processor 114.

Figure 4:
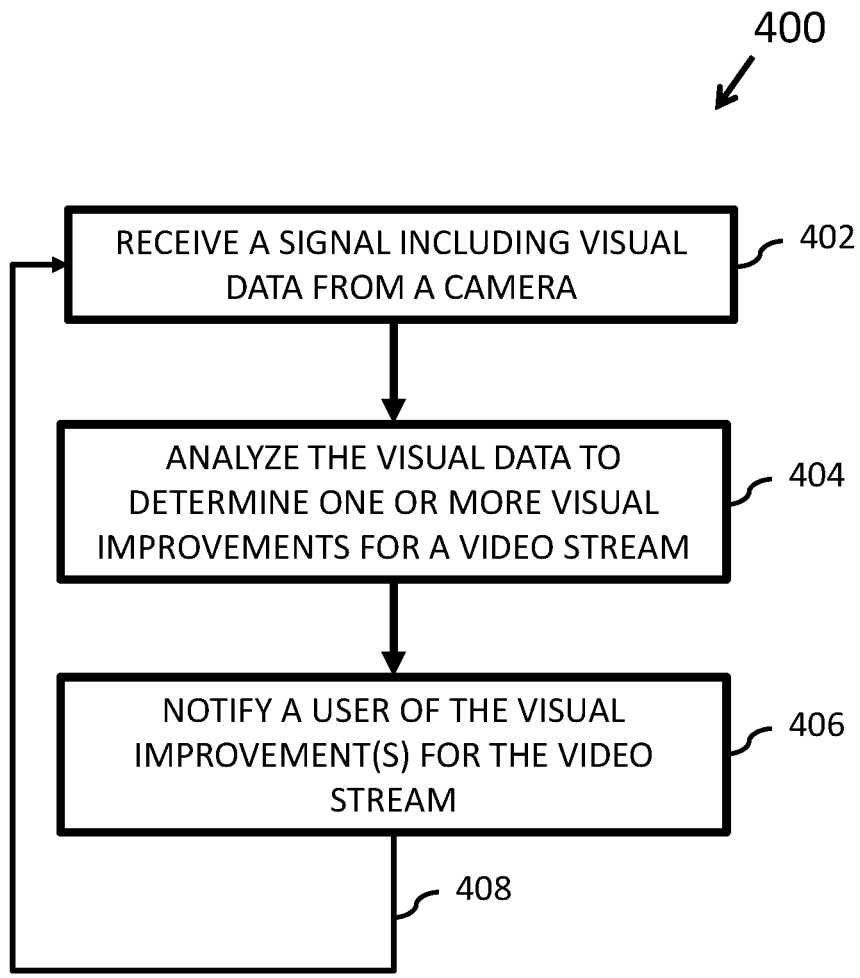
FIGS. 4 through 12 are schematic flow chart diagrams illustrating various embodiments of a method for improving production value of a video stream.

FIG. 4 is a schematic flow chart diagram illustrating one embodiment of a method 400 for improving production value of a video stream (e.g., a video conference, digital learning environment, and the like video streams). At least in the illustrated embodiment, the method 400 begins by a processor 114 (e.g., processor 114A, 114B, and 114C) receiving a signal from a camera 102 in which the signal includes data for an environment (block 402).

In some embodiments, a portion of the environment is within a field of view of the camera 102. Further, the data represents a set of attributes related to a current situation of the environment within the field of view of the camera 102.

The processor 114 analyzes the data to determine at least one improvement related to at least one attribute in the set of attributes (block 404). The attribute(s) can be related to the current situation of the environment within the field of view of the camera 102 that, after implementation, would increase a production value of a video stream of the current situation of the environment within the field of view of the camera 102. Further, the determined improvement can be any of the visual improvement(s) set forth above.

The method 400 further includes the processor 114 notifying a user of the determination (block 406). The method 400 may then be repeated for each subsequent video stream (return 408). That is, the improvement(s) can be learned, stored, and applied to one or more subsequent video streams that include the same attributes as the current situation.

Figure 5:
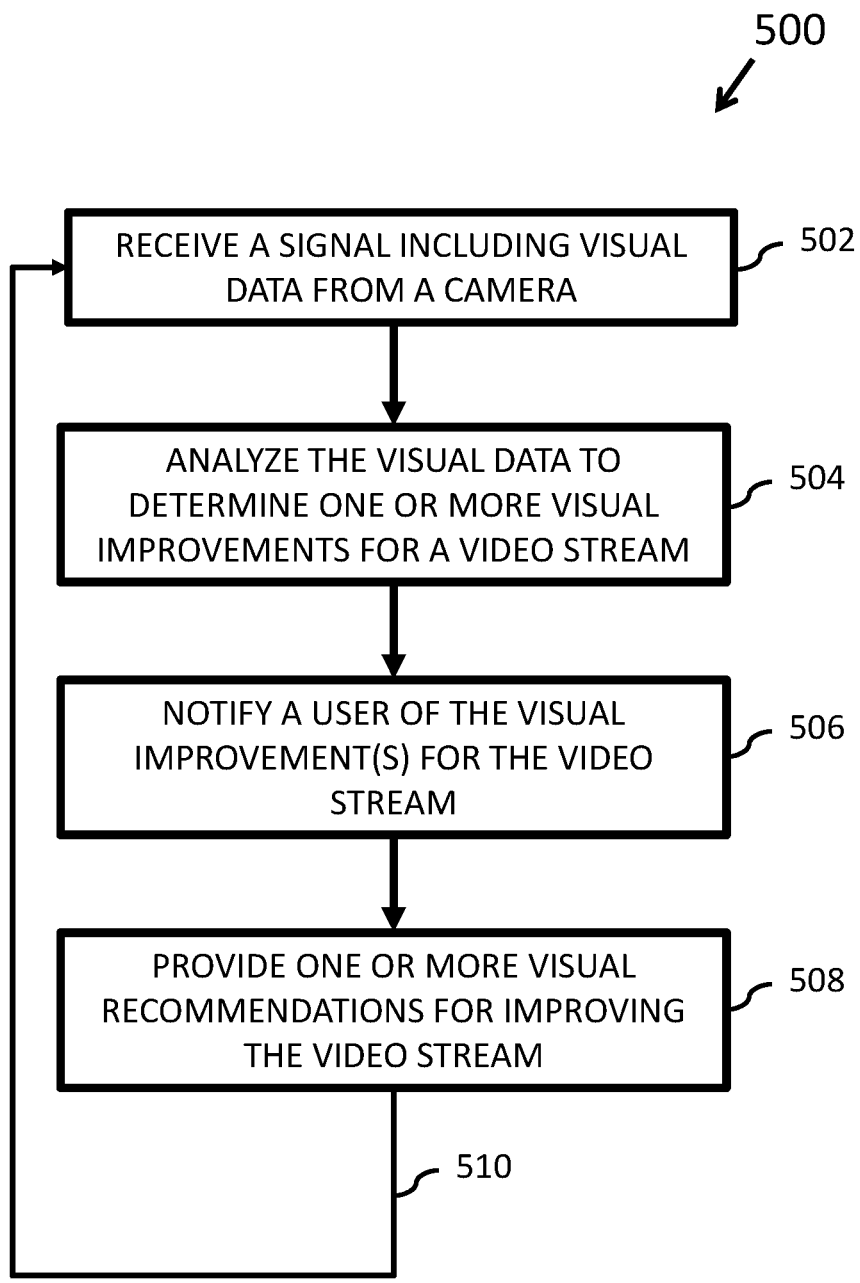

FIG. 5 is a schematic flow chart diagram illustrating another embodiment of a method 500 for improving production value of a video stream (e.g., a video conference, digital learning environment, and the like video streams). At least in the illustrated embodiment, the method 500 begins by a processor 114 (e.g., processor 114A, 114B, and 114C) receiving a signal from a camera 102 in which the signal includes data for an environment (block 502).

In some embodiments, a portion of the environment is within a field of view of the camera 102. Further, the data represents a set of attributes related to a current situation of the environment within the field of view of the camera 102.

The processor 114 analyzes the data to determine at least one improvement related to at least one attribute in the set of attributes (block 504). The attribute(s) can be related to the current situation of the environment within the field of view of the camera 102 that, after implementation, would increase a production value of a video stream of the current situation of the environment within the field of view of the camera 102. Further, the determined improvement can be any of the visual improvement(s) set forth above.

The method 500 further includes the processor 114 notifying a user of the determination (block 506) and providing a recommendation to the user for modifying the at least one attribute based on the at least one improvement determined to increase the production value of the video stream (block 508). Further, the recommendation(s) can be any of the recommendation(s) set forth above.

The method 500 may then be repeated for each subsequent video stream (return 510). That is, the improvement(s) and/or recommendation(s) can be learned, stored, and applied to one or more subsequent video streams that include the same attributes as the current situation.

Figure 6:
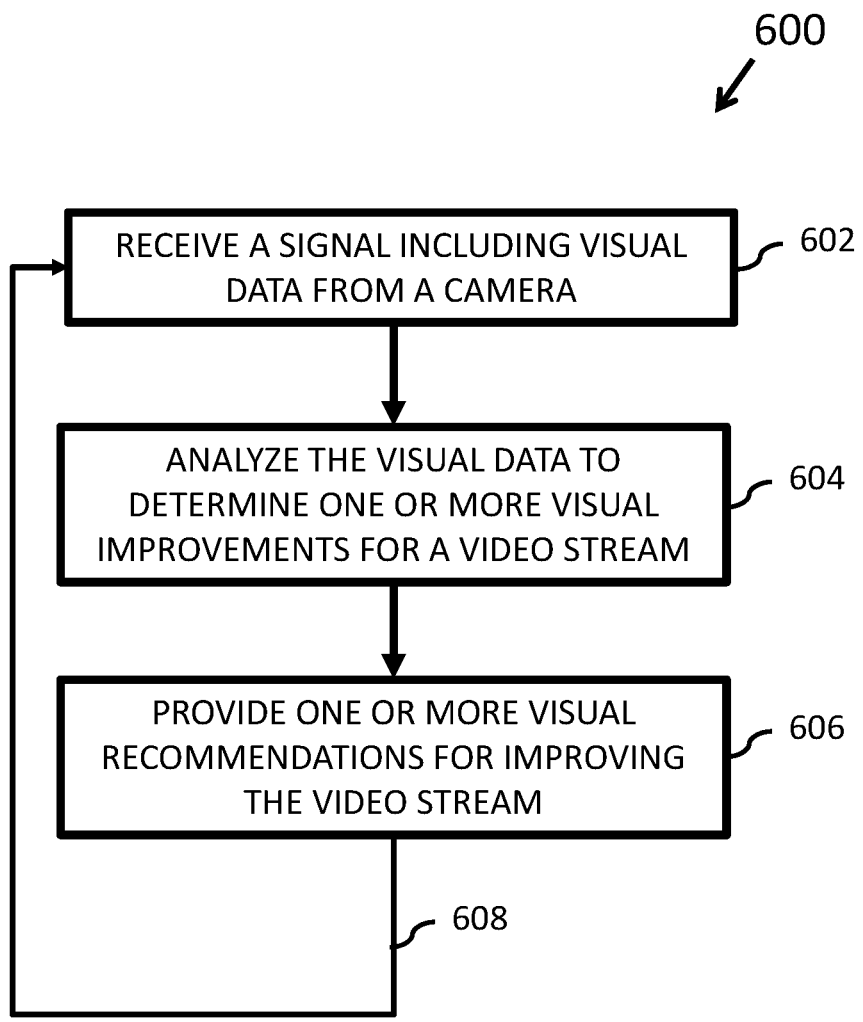

FIG. 6 is a schematic flow chart diagram illustrating yet another embodiment of a method 600 for improving production value of a video stream (e.g., a video conference, digital learning environment, and the like video streams). At least in the illustrated embodiment, the method 600 begins by a processor 114 (e.g., processor 114A, 114B, and 114C) receiving a signal from a camera 102 in which the signal includes data for an environment (block 602).

In some embodiments, a portion of the environment is within a field of view of the camera 102. Further, the data represents a set of attributes related to a current situation of the environment within the field of view of the camera 102.

The processor 114 analyzes the data to determine at least one recommendation related to at least one attribute in the set of attributes (block 604). The recommendation(s) can be related to the current situation of the environment within the field of view of the camera 102 that, after implementation, would increase a production value of a video stream of the current situation of the environment within the field of view of the camera 102.

The method 600 further includes the processor 114 providing a recommendation to the user for modifying the at least one attribute to increase the production value of the video stream (block 606). Further, the recommendation(s) can be any of the recommendation(s) set forth above. The method 600 may then be repeated for each subsequent video stream (return 608). That is, the recommendation(s) can be learned, stored, and applied to one or more subsequent video streams that include the same attributes as the current situation.

Figure 7:
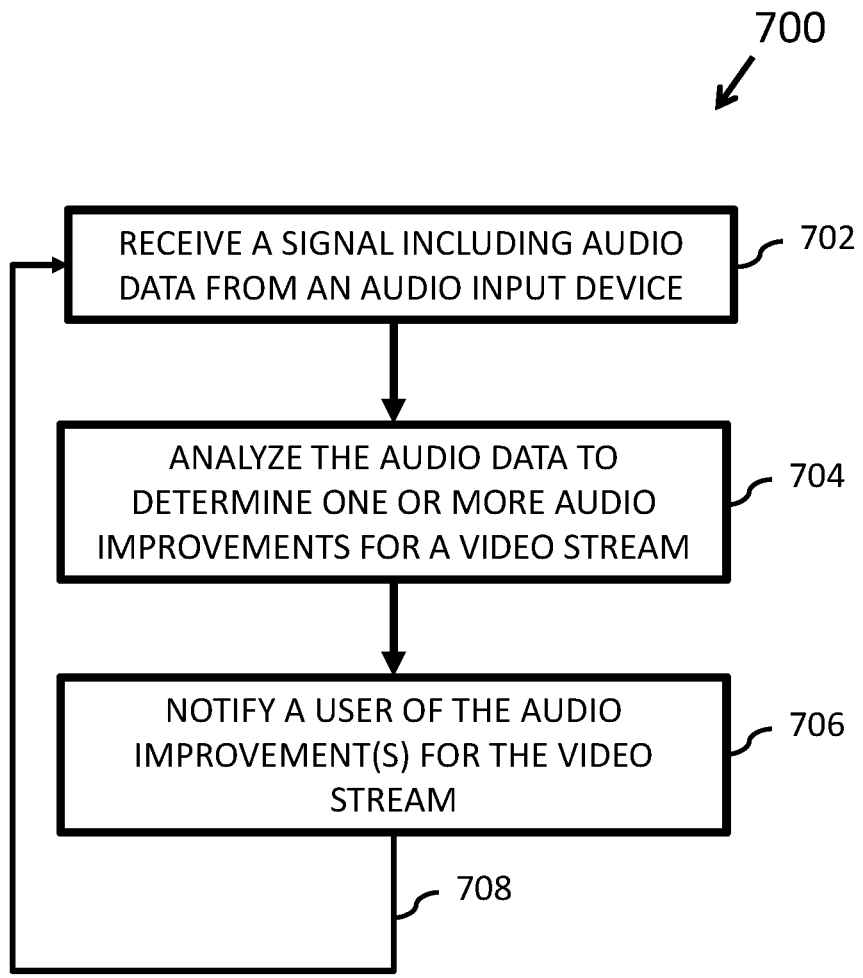

FIG. 7 is a schematic flow chart diagram illustrating an embodiment of a method 700 for improving production value of a video stream (e.g., a video conference, digital learning environment, and the like video streams). At least in the illustrated embodiment, the method 700 begins by a processor 114 (e.g., processor 114A, 114B, and 114C) receiving a signal from an audio input device 104 in which the signal includes audio data for an environment (block 702). In some embodiments, the data represents a set of audio attributes related to a current situation of the environment.

The processor 114 analyzes the audio data to determine at least one improvement related to at least one attribute in the set of attributes (block 704). The attribute(s) can be related to audio of the current situation of the environment that, after implementation, would increase a production value of a video stream of the current situation of the environment. Further, the determined improvement can be any of the audio improvement(s) set forth above.

The method 700 further includes the processor 114 notifying a user of the determination (block 706). The method 700 may then be repeated for each subsequent video stream (return 708). That is, the improvement(s) can be learned, stored, and applied to one or more subsequent video streams that include the same attributes as the current situation.

Figure 8:
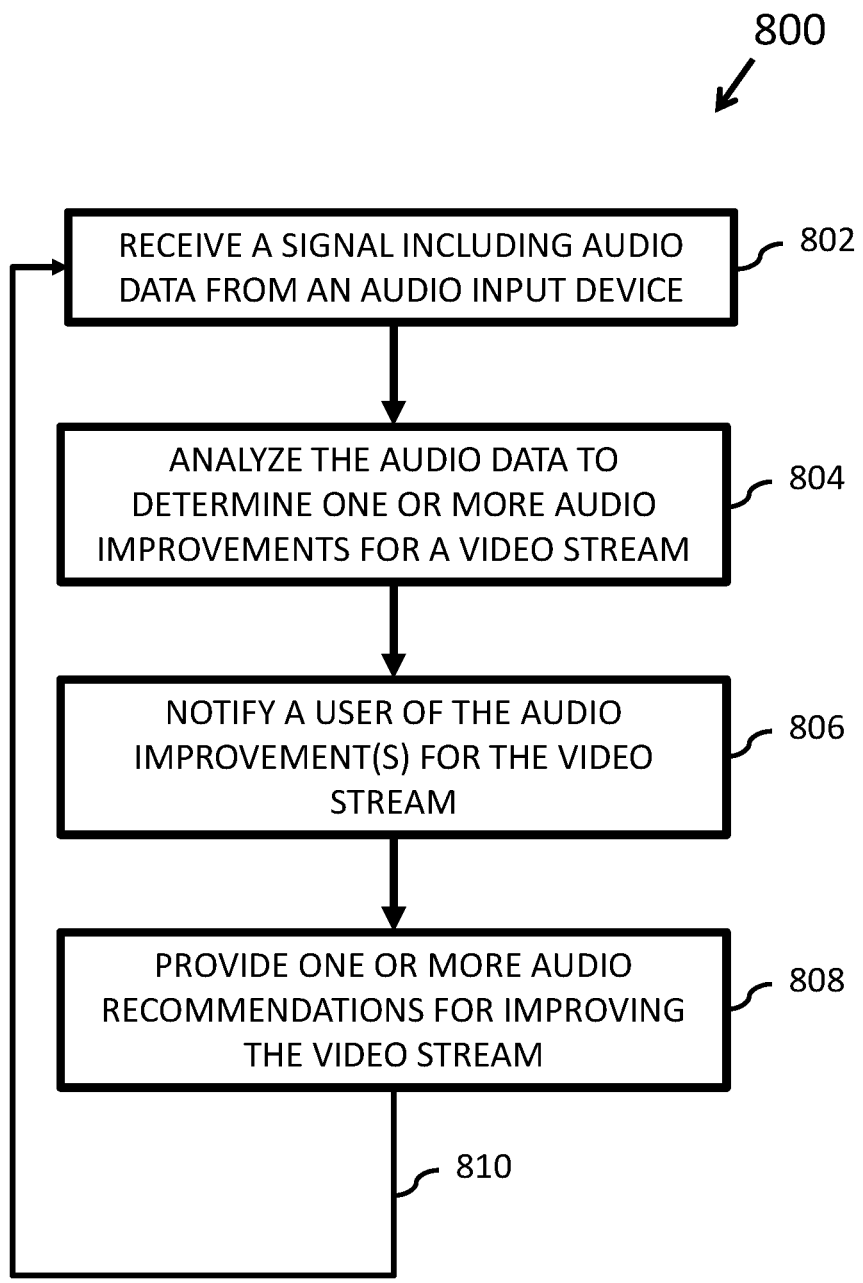

FIG. 8 is a schematic flow chart diagram illustrating another embodiment of a method 800 for improving production value of a video stream (e.g., a video conference, digital learning environment, and the like video streams). At least in the illustrated embodiment, the method 800 begins by a processor 114 (e.g., processor 114A, 114B, and 114C) receiving a signal from an audio input device 104 in which the signal includes audio data for an environment (block 802). In some embodiments, the audio data represents a set of audio attributes related to a current situation of the environment.

The processor 114 analyzes the audio data to determine at least one improvement related to at least one attribute in the set of attributes (block 804). The attribute(s) can be related to audio of the current situation of the environment that, after implementation, would increase a production value of a video stream of the current situation of the environment. Further, the determined improvement can be any of the visual improvement(s) set forth above.

The method 800 further includes the processor 114 notifying a user of the determination (block 806) and providing a recommendation to the user for modifying the at least one attribute based on the at least one improvement determined to increase the production value of the video stream (block 808). Further, the recommendation(s) can be any of the recommendation(s) set forth above.

The method 800 may then be repeated for each subsequent video stream (return 810). That is, the improvement(s) and/or recommendation(s) can be learned, stored, and applied to one or more subsequent video streams that include the same attributes as the current situation.

Figure 9:
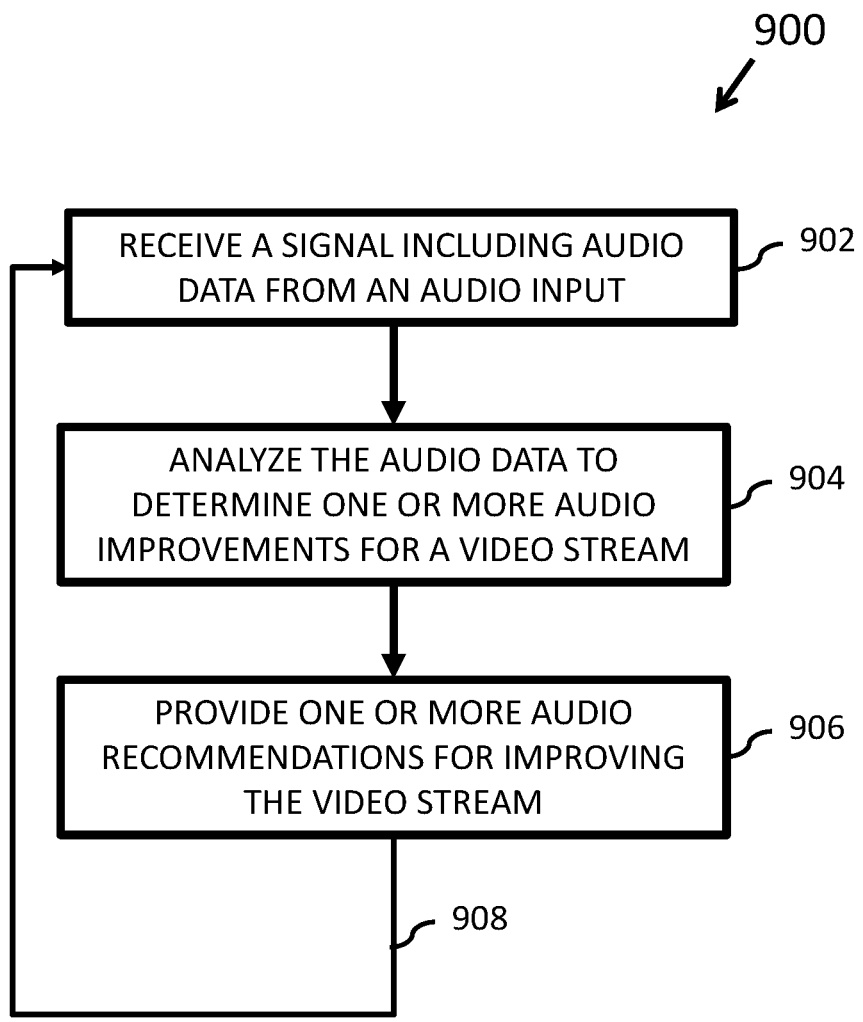

FIG. 9 is a schematic flow chart diagram illustrating yet another embodiment of a method 900 for improving production value of a video stream (e.g., a video conference, digital learning environment, and the like video streams). At least in the illustrated embodiment, the method 900 begins by a processor 114 (e.g., processor 114A, 114B, and 114C) receiving a signal from an audio input device 104 in which the signal includes audio data for an environment (block 902). In some embodiments, the audio data represents a set of attributes related to audio of a current situation of the environment.

The processor 114 analyzes the audio data to determine at least one recommendation related to at least one attribute in the set of attributes (block 904). The recommendation(s) can be related to audio of the current situation of the environment that, after implementation, would increase a production value of a video stream of the current situation of the environment.

The method 900 further includes the processor 114 providing a recommendation to the user for modifying the at least one attribute to increase the production value of the video stream (block 906). Further, the recommendation(s) can be any of the recommendation(s) set forth above. The method 900 may then be repeated for each subsequent video stream (return 908). That is, the recommendation(s) can be learned, stored, and applied to one or more subsequent video streams that include the same attributes as the current situation.

Figure 10:
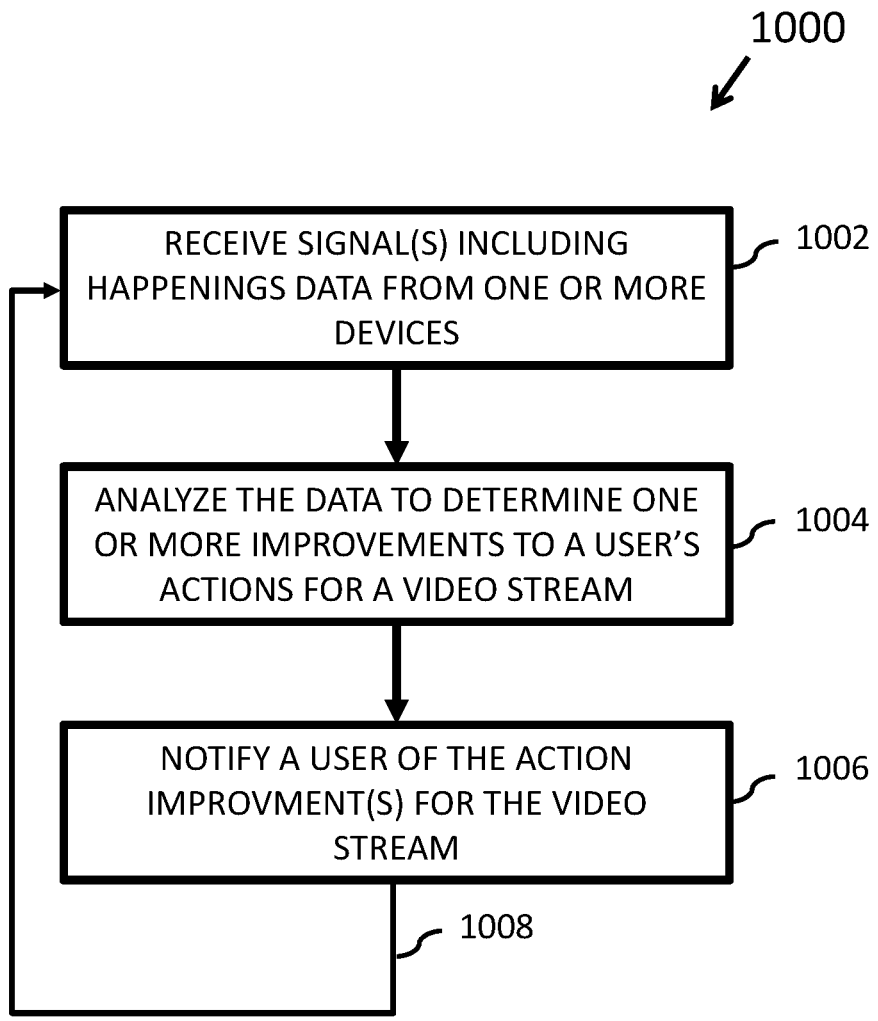

FIG. 10 is a schematic flow chart diagram illustrating an embodiment of a method 1000 for improving production value of a video stream (e.g., a video conference, digital learning environment, and the like video streams). At least in the illustrated embodiment, the method 1000 begins by a processor 114 (e.g., processor 114A, 114B, and 114C) receiving one or more signals from one or more devices (e.g., a camera 102 and/or an audio input device 104) in which the signal includes data for an environment (block 1002). In some embodiments, the data represents a set of attributes related to current happenings in the environment.

The processor 114 analyzes the data to determine at least one improvement related to at least one user action (block 1004). The improvement(s), after implementation, would increase a production value of a video stream. Further, the determined improvement can be any of the improvement(s) related to a user's action(s) set forth above.

The method 1000 further includes the processor 114 notifying a user of the determination (block 1006). The method 1000 may then be repeated for each subsequent video stream (return 1008). That is, the improvement(s) can be learned, stored, and applied to one or more subsequent video streams that include the same attributes as the current situation.

Figure 11:
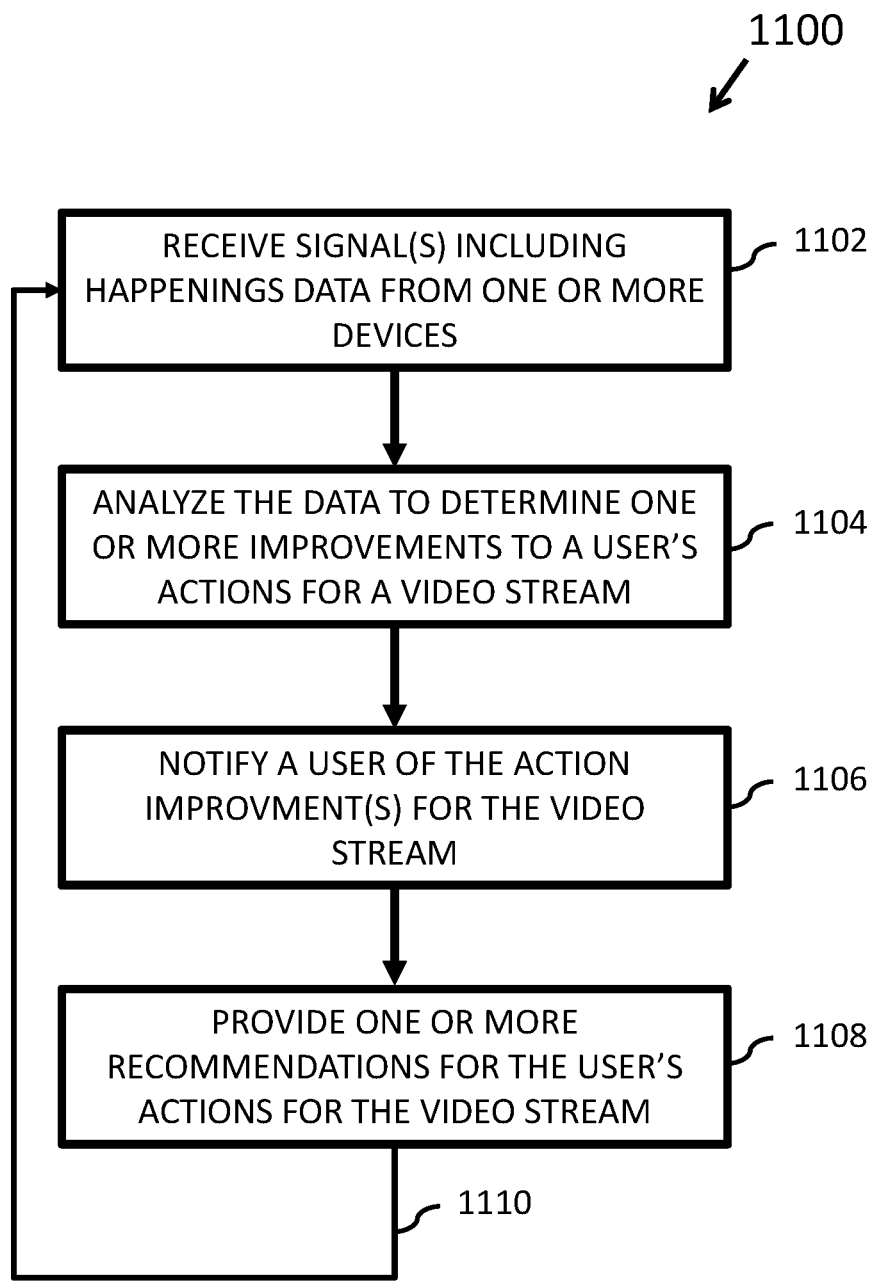

FIG. 11 is a schematic flow chart diagram illustrating another embodiment of a method 1100 for improving production value of a video stream (e.g., a video conference, digital learning environment, and the like video streams). At least in the illustrated embodiment, the method 1100 begins by a processor 114 (e.g., processor 114A, 114B, and 114C) receiving a signal from one or more devices (e.g., a camera 102 and/or an audio input device 104) in which the signal includes data for an environment (block 1002). In some embodiments, the data represents a set of attributes related to current happenings in the environment.

The processor 114 analyzes the data to determine at least one improvement related to at least one user action (block 1104). The improvement(s), after implementation, would increase a production value of a video stream. Further, the determined improvement can be any of the improvement(s) related to a user's action(s) set forth above.

The method 1100 further includes the processor 114 notifying a user of the determination (block 1106) and providing a recommendation to the user's action(s) to increase the production value of the video stream (block 1108). Further, the recommendation(s) can be any of the recommendation(s) set forth above.

The method 1100 may then be repeated for each subsequent video stream (return 1110). That is, the improvement(s) and/or recommendation(s) can be learned, stored, and applied to one or more subsequent video streams that include the same attributes as the current situation.

Figure 12:
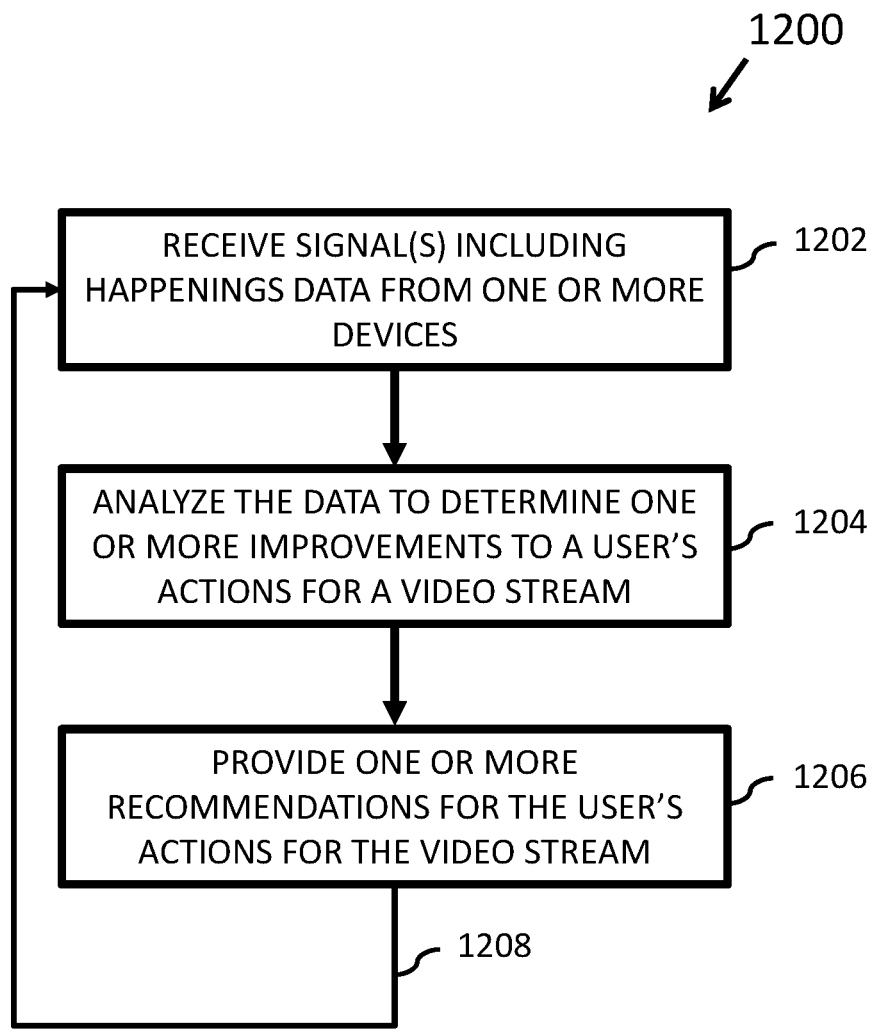

FIG. 12 is a schematic flow chart diagram illustrating yet another embodiment of a method 1200 for improving production value of a video stream (e.g., a video conference, digital learning environment, and the like video streams). At least in the illustrated embodiment, the method 1200 begins by a processor 114 (e.g., processor 114A, 114B, and 114C) receiving a signal from one or more devices (e.g., a camera 102 and/or an audio input device 104) in which the signal includes data for an environment (block 1202). In some embodiments, the data represents a set of attributes related to current happenings in the environment.

The processor 114 analyzes the data to determine at least one improvement related to at least one user action (block 1204). The improvement(s), after implementation, would increase a production value of a video stream. Further, the determined improvement can be any of the improvement(s) related to a user's action(s) set forth above.

The method 1200 further includes the processor 114 providing a recommendation to the user for modifying the user's action(s) to increase the production value of the video stream (block 1206). Further, the recommendation(s) can be any of the recommendation(s) set forth above.

The method 1200 may then be repeated for each subsequent video stream (return 1208). That is, the recommendation(s) can be learned, stored, and applied to one or more subsequent video streams that include the same attributes as the current situation.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
receive, from a camera, a signal including data for an environment, wherein:
a first portion of the environment is within a field of view of the camera, and
the data represents a set of attributes related to a current situation of the first portion of the environment within the field of view of the camera,
analyze the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera,
repeat the receiving, analyzing, and notifying for at least one subsequent video stream including subsequent data representing the set of attributes related to a subsequent current situation of the first portion of the environment within the field of view of the camera to learn a set of different determined improvements corresponding to different current situations of the first portion of the environment within the field of view of the camera, and notify a user of each determination.

2. The apparatus of claim 1, wherein the code is further executable by the processor to:
provide a recommendation to the user for modifying the at least one attribute based on the at least one improvement determined to increase the production value of the video stream.

3. The apparatus of claim 1, wherein:
the at least one improvement is related to at least one of a lighting and a relative lighting within the first portion of the environment within the field of view of the camera; and
a light source for the at least one of the lighting and the relative lighting is located within at least one of the first portion of the environment within the field of view of the camera and a second portion of the environment outside the field of view of the camera.

4. The apparatus of claim 1, wherein:
the at least one improvement is related to at least one of a positioning and a relative positioning of at least one object located within the first portion of the environment within the field of view of the camera.

5. The apparatus of claim 1, wherein the at least one improvement is related to at least one of:
a coloring of at least one object located within the first portion of the environment within the field of view of the camera; and
a relative coloring between at least two objects located within the first portion of the environment within the field of view of the camera.

6. The apparatus of claim 1, wherein:
the at least one improvement is related to at least one user action occurring in the first portion of the environment within the field of view of the camera during the video stream.

7. The apparatus of claim 1, wherein:
the at least one improvement is related to at least one rule implemented by the user.

8. The apparatus of claim 1, wherein the code is further executable by the processor to:
apply each different determined improvement with its corresponding different current situation in response to identifying each corresponding different current situation.

9. A method, comprising:
receiving, by a processor, a signal from a camera, the signal including data for an environment, wherein:
a first portion of the environment is within a field of view of the camera, and the data represents a set of attributes related to a current situation of the first portion of the environment within the field of view of the camera;

analyzing the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera;

repeating the receiving, analyzing, and notifying for at least one subsequent video stream including subsequent data representing the set of attributes related to a subsequent current situation of the first portion of the environment within the field of view of the camera to learn a set of different determined improvements corresponding to different current situations of the first portion of the environment within the field of view of the camera; and notifying a user of each determination.

10. The method of claim 9, further comprising:
providing a recommendation to the user for modifying the at least one attribute based on the at least one improvement determined to increase the production value of the video stream.

11. The method of claim 9, wherein:
the at least one improvement is related to at least one of
a lighting and a relative lighting within the first portion of the environment within the field of view of the camera; and
a light source for the at least one of the lighting and the relative lighting is located within at least one of the first portion of the environment within the field of view of the camera and a second portion of the environment outside the field of view of the camera.

12. The method of claim 9, wherein:
the at least one improvement is related to at least one of a positioning and a relative positioning of at least one object located within the first portion of the environment within the field of view of the camera.

13. The method of claim 9, wherein the at least one improvement is related to at least one of:
a coloring of at least one object located within the first portion of the environment within the field of view of the camera; and
a relative coloring between at least two objects located within the first portion of the environment within the field of view of the camera.

14. The method of claim 9, wherein:
the at least one improvement is related to at least one user action occurring in the first portion of the environment within the field of view of the camera during the video stream.

15. The method of claim 9, wherein:
the at least one improvement is related to at least one rule implemented by the user.

16. The method of claim 9, further comprising:
applying each different determined improvement with its corresponding different current situation in response to identifying each corresponding different current situation.

17. A computer program product comprising a non-transitory computer-readable storage device including code embodied therewith, the code executable by a processor to cause the processor to:

receive, from a camera, a signal including data for an environment, wherein:
a first portion of the environment is within a field of view of the camera, and
the data represents a set of attributes related to a current situation of the first portion of the environment within the field of view of the camera;

analyze the data to determine at least one improvement related to at least one attribute in the set of attributes related to the current situation of the first portion of the environment within the field of view of the camera that, after implementation, would increase a production value of a video stream of the current situation of the first portion of the environment within the field of view of the camera;

repeat the receiving, analyzing, and notifying for at least one subsequent video stream including subsequent data representing the set of attributes related to a subsequent current situation of the first portion of the environment within the field of view of the camera to learn a set of different determined improvements corresponding to different current situations of the first portion of the environment within the field of view of the camera; and notify a user of each determination.

18. The computer program product of claim 17, wherein the executable code further causes the processor to:
provide a recommendation to the user for modifying the at least one attribute based on the at least one improvement determined to increase the production value of the video stream.

19. The computer program product of claim 17, wherein:
the at least one improvement is related to at least one of:
a lighting within the first portion of the environment within the field of view of the camera,
a relative lighting within the first portion of the environment within the field of view of the camera,
a positioning of at least one object located within the first portion of the environment within the field of view of the camera,
a relative positioning of at least one object located within the first portion of the environment within the field of view of the camera,
a coloring of at least one object located within the first portion of the environment within the field of view of the camera,
a relative coloring between at least two objects located within the first portion of the environment within the field of view of the camera,
at least one user action occurring in the first portion of the environment within the field of view of the camera during the video stream, and
at least one rule implemented by the user; and
a light source for the lighting and the relative lighting is located within at least one of the first portion of the environment within the field of view of the camera and a second portion of the environment outside the field of view of the camera.

20. The computer program product of claim 17, wherein the executable code further causes the processor to:
apply each different determined improvement with its corresponding different current situation in response to identifying each corresponding different current situation.

* * * * *